(12) United States Patent
Sawa et al.

(10) Patent No.: US 7,606,987 B2
(45) Date of Patent: Oct. 20, 2009

(54) APPARATUS AND METHOD FOR MAGNETIC HEAD CONTROL IN STORAGE ACCESSES

(75) Inventors: Tsutomu Sawa, Kanagawa-ken (JP); Tomoko Taketomi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 11/530,936

(22) Filed: Sep. 12, 2006

(65) Prior Publication Data

US 2007/0079053 A1   Apr. 5, 2007

(30) Foreign Application Priority Data

Oct. 4, 2005   (JP)   ............... 2005-291469

(51) Int. Cl.
*G06F 12/00* (2006.01)

(52) U.S. Cl. .............. 711/154; 711/170; 711/4

(58) Field of Classification Search ............ 711/4, 711/170, 154, 202, 203, 156, 112, 114, 113
See application file for complete search history.

(56) References Cited

U.S. PATENT DOCUMENTS

| | | | |
|---|---|---|---|
| 6,014,731 A | | 1/2000 | Totsuka et al. |
| 6,052,759 A | * | 4/2000 | Stallmo et al. ............. 711/170 |
| 6,665,830 B2 | * | 12/2003 | Hornung et al. ............. 711/165 |
| 6,977,927 B1 | * | 12/2005 | Bates et al. ................. 711/111 |
| 7,024,528 B2 | * | 4/2006 | LeCrone et al. ............. 711/162 |
| 7,054,893 B2 | * | 5/2006 | Mogi et al. ................. 707/205 |

FOREIGN PATENT DOCUMENTS

| | | |
|---|---|---|
| JP | 08-017171 | 1/1996 |
| JP | 2001-357636 | 12/2001 |
| JP | 2003-296904 | 10/2003 |
| JP | 2004-103127 | 4/2004 |
| JP | 2005-259284 | 9/2005 |

* cited by examiner

*Primary Examiner*—Pierre-Michel Bataille
(74) *Attorney, Agent, or Firm*—Roy W. Truelson

(57) ABSTRACT

To prevent for a prolonged time period, the fixed-position floating status of a head in the control operation of a storage unit, and to prevent a decrease in the reliability due to deterioration in the properties of a storage medium, a control apparatus is described. The control apparatus relays read/write instructions for a magnetic disk unit, and includes an access-area setting unit that dynamically specifies one of a plurality of unit areas provided in a magnetic disk storage area as an access area for data, an addressing unit that updates the value of a write address in a data write request with an address that represents a physical sector corresponding to an access area in the storage area, and a valid-area changing unit that migrates data to a sector in an access area from a physical sector in another unit area corresponding to the sector at predetermined time.

25 Claims, 13 Drawing Sheets

FIG. 4

| UNIT AREA / SECTOR | A(0) | A(1) | A(2) | A(3) | A(4) | A(5) | A(6) |
|---|---|---|---|---|---|---|---|
| S(0) | 0 | 10 | 20 | 30 | 40 | 50 | 60 |
| S(1) | 1 | 11 | 21 | 31 | 41 | 51 | 61 |
| S(2) | 2 | 12 | 22 | 32 | 42 | 52 | 62 |
| S(3) | 3 | 13 | 23 | 33 | 43 | 53 | 63 |
| S(4) | 4 | 14 | 24 | 34 | 44 | 54 | 64 |
| S(5) | 5 | 15 | 25 | 35 | 45 | 55 | 65 |
| S(6) | 6 | 16 | 26 | 36 | 46 | 56 | 66 |
| S(7) | 7 | 17 | 27 | 37 | 47 | 57 | 67 |
| S(8) | 8 | 18 | 28 | 38 | 48 | 58 | 68 |
| S(9) | 9 | 19 | 29 | 39 | 49 | 59 | 69 |

FIG. 6

| UNIT AREA<br>SECTOR | A(0) | A(1) | A(2) | A(3) | A(4) | A(5) | A(6) | VA(i) |
|---|---|---|---|---|---|---|---|---|
| S(0) | 0 | 10 | 20 | 30 | 40 | 50 | 60 | 0 |
| S(1) | 1 | 11 | 21 | 31 | 41 | 51 | 61 | 1 |
| S(2) | 2 | 12 | 22 | 32 | 42 | 52 | 62 | 2 |
| S(3) | 3 | 13 | 23 | 33 | 43 | 53 | 63 | 3 |
| S(4) | 4 | 14 | 24 | 34 | 44 | 54 | 64 | 4 |
| S(5) | 5 | 15 | 25 | 35 | 45 | 55 | 65 | 5 |
| S(6) | 6 | 16 | 26 | 36 | 46 | 56 | 66 | 6 |
| S(7) | 7 | 17 | 27 | 37 | 47 | 57 | 67 | 7 |
| S(8) | 8 | 18 | 28 | 38 | 48 | 58 | 68 | 8 |
| S(9) | 9 | 19 | 29 | 39 | 49 | 59 | 69 | 9 |

| UNIT AREA / SECTOR | A(0) | A(1) | A(2) | A(3) | A(4) | A(5) | A(6) | VA(i) |
|---|---|---|---|---|---|---|---|---|
| S(0) | 0 | 10 | 20 | 30 | 40 | 50 | 60 | 0 |
| S(1) | 1 | 11 | 21 | 31 | 41 | 51 | 61 | 1 |
| S(2) | 2 | 12 | 22 | 32 | 42 | 52 | 62 | 2 |
| S(3) | 3 | 13 | 23 | 33 | 43 | 53 | 63 | 3 |
| S(4) | 4 | 14 | 24 | 34 | 44 | 54 | 64 | 4 |
| S(5) | 5 | 15 | 25 | 35 | 45 | 55 | 65 | 5 |
| S(6) | 6 | 16 | 26 | 36 | 46 | 56 | 66 | 6 |
| S(7) | 7 | 17 | 27 | 37 | 47 | 57 | 67 | 7 |
| S(8) | 8 | 18 | 28 | 38 | 48 | 58 | 68 | 8 |
| S(9) | 9 | 19 | 29 | 39 | 49 | 59 | 69 | 9 |

| UNIT AREA / SECTOR | A(0) | A(1) | A(2) | A(3) | A(4) | A(5) | A(6) | VA(i) |
|---|---|---|---|---|---|---|---|---|
| S(0) | 0 | 10 | 20 | 30 | 40 | 50 | 60 | 0 |
| S(1) | 1 | 11 | 21 | 31 | 41 | 51 | 61 | 41 |
| S(2) | 2 | 12 | 22 | 32 | 42 | 52 | 62 | 2 |
| S(3) | 3 | 13 | 23 | 33 | 43 | 53 | 63 | 3 |
| S(4) | 4 | 14 | 24 | 34 | 44 | 54 | 64 | 4 |
| S(5) | 5 | 15 | 25 | 35 | 45 | 55 | 65 | 5 |
| S(6) | 6 | 16 | 26 | 36 | 46 | 56 | 66 | 6 |
| S(7) | 7 | 17 | 27 | 37 | 47 | 57 | 67 | 47 |
| S(8) | 8 | 18 | 28 | 38 | 48 | 58 | 68 | 8 |
| S(9) | 9 | 19 | 29 | 39 | 49 | 59 | 69 | 9 |

| UNIT AREA / SECTOR | A(0) | A(1) | A(2) | A(3) | A(4) | A(5) | A(6) | VA(i) |
|---|---|---|---|---|---|---|---|---|
| S(0) | 0 | 10 | 20 | 30 | 40 | 50 | 60 | 0 |
| S(1) | 1 | 11 | 21 | 31 | 41 | 51 | 61 | 41 |
| S(2) | 2 | 12 | 22 | 32 | 42 | 52 | 62 | 42 |
| S(3) | 3 | 13 | 23 | 33 | 43 | 53 | 63 | 43 |
| S(4) | 4 | 14 | 24 | 34 | 44 | 54 | 64 | 44 |
| S(5) | 5 | 15 | 25 | 35 | 45 | 55 | 65 | 5 |
| S(6) | 6 | 16 | 26 | 36 | 46 | 56 | 66 | 46 |
| S(7) | 7 | 17 | 27 | 37 | 47 | 57 | 67 | 47 |
| S(8) | 8 | 18 | 28 | 38 | 48 | 58 | 68 | 8 |
| S(9) | 9 | 19 | 29 | 39 | 49 | 59 | 69 | 49 |

| UNIT AREA / SECTOR | A(0) | A(1) | A(2) | A(3) | A(4) | A(5) | A(6) | VA(i) |
|---|---|---|---|---|---|---|---|---|
| S(0) | 0 | 10 | 20 | 30 | 40 | 50 | 60 | 0 |
| S(1) | 1 | 11 | 21 | 31 | 41 | 51 | 61 | 11 |
| S(2) | 2 | 12 | 22 | 32 | 42 | 52 | 62 | 12 |
| S(3) | 3 | 13 | 23 | 33 | 43 | 53 | 63 | 13 |
| S(4) | 4 | 14 | 24 | 34 | 44 | 54 | 64 | 14 |
| S(5) | 5 | 15 | 25 | 35 | 45 | 55 | 65 | 15 |
| S(6) | 6 | 16 | 26 | 36 | 46 | 56 | 66 | 16 |
| S(7) | 7 | 17 | 27 | 37 | 47 | 57 | 67 | 47 |
| S(8) | 8 | 18 | 28 | 38 | 48 | 58 | 68 | 18 |
| S(9) | 9 | 19 | 29 | 39 | 49 | 59 | 69 | 19 |

APPARATUS AND METHOD FOR MAGNETIC HEAD CONTROL IN STORAGE ACCESSES

FIELD OF THE INVENTION

The present invention relates to control of storage units of, for example, computer systems, and more specifically, relates to control of storage units in which data is read and written by means of heads with magnetic disks or the like.

DESCRIPTION OF THE RELATED ART

Recently, information apparatuses used in computers have been widely available and have been utilized for various types of applications. Some of these information apparatuses are used continuously for a long period of time. For example, in an automated-teller machine (ATM) that is placed in a 24-hour shop, the status of the machine is monitored, and the log is maintained and written to a magnetic disk unit (hard disk drive (HDD)). Thus, the magnetic disk unit keeps operating regardless of whether access due to, for example, transactions occurs.

In such a magnetic disk unit that continuously operates for a long period of time, a problem may arise during a fixed-position floating status. In the fixed-position status a magnetic head operates while being located above a certain track of a platter (i.e. magnetic disk plate). If the magnetic head is in this fixed-position for a long period of time, local deterioration in properties occurs, thereby decreasing reliability. In general, a magnetic head is provided on a back end of a small plate of about 1 mm square, which is called a slider. When data is read or written by means of a magnetic head, a slider keeps the magnetic head in status in which the magnetic head floats with a minute gap between the magnetic head and a platter by means of air pressure generated by rotation of the platter. To be precise, the problems described below due to fixed-position floating status are caused by a slider. However, in the present specification, what is called a magnetic head includes a slider for the sake of simplification.

When the platter keeps rotating while the magnetic head stays in a narrow area for a long period of time, air pressure between the magnetic head and the platter pushes a lubricant applied to the platter surface away to both sides of the magnetic head, thus creating walls. When the magnetic head collides with these walls of the lubricant, the magnetic head may sharply bound and collide with the platter surface, so that the magnetic surface is damaged, or heat due to friction with the lubricant may increase the temperature, so that the temperature locally exceeds the Curie point, and the magnetic surface is demagnetized. These may be causes of read errors. Moreover, in a case where data is written, when the magnetic head collides with the walls of the lubricant, the head gap may be changed due to the impact of the collision, so that write operation is unstable, or the magnetic surface to which the data is written may be demagnetized due to the frictional heat. These may be causes of read errors.

A type of motion control may be a measure against this fixed-position floating status problem, in which when a magnetic head stays at the same position because no access occurs for a predetermined period of time or more, the magnetic head is forcibly returned to a home position (an original position). However, in an apparatus such as the aforementioned 24-hour ATM, in which the status log of the apparatus is periodically obtained in a short cycle and written to the magnetic disk unit, the aforementioned control is not performed. Because in these situations the magnetic head is not returned to the home position, this type of motion control is not an effective measure against the described fixed-position floating problem.

SUMMARY OF THE INVENTION

It is preferable that the fixed-position floating status of a magnetic head is not stationary in a location above a certain track of a magnetic disk unit that is continuously operating for a long period of time, as described above. This preference has a greater need as the storage capacity and the track density of magnetic disk units has been greatly increased. Thus, the moving distance of a magnetic head has been shortened even when the same amount of data is read or written. Consequently, the status is likely to occur, in which a magnetic head stays above a certain track. Thus, a method is required, in which the fixed-position floating status of a magnetic head can be effectively prevented from staying in a stationary location for a long period of time.

A similar problem due to the fixed-position floating status of a head may occur in storage units other than a magnetic disk unit. For example, in a storage unit that includes an optical disk (for example, a DVD-RAM) to which data can be rewritten more than once. It is known that, when access (data read and write) to a certain track continues, an increased temperature of the track causes a deterioration in the properties of the medium.

Accordingly, one purpose of the present invention to effectively prevent the fixed-position floating status of a head from keeping for a long period of time in the control operation of magnetic disk units or other storage units to prevent a decrease in the reliability due to a deterioration in the properties of a storage medium.

The present invention is implemented as a control apparatus that has the following configuration. This control apparatus intervenes between a storage unit and a CPU that issues read and write instructions to the storage unit. A storage medium in the storage unit includes a plurality of unit areas in at least a part of the storage medium, each unit area including a plurality of physical sectors. The control apparatus dynamically specifies, with an access-area setting unit, one of the unit areas, in which logical sectors are assigned to respective physical sectors, as an access area for data. The control apparatus further updates, with an addressing unit, a first address specified as a write address in a data write request with a second address that represents a physical sector corresponding to a logical sector associated with the first address in the unit area specified as the access area. At predetermined time, the control apparatus further migrates, with a valid-area changing unit, whole data in a first physical sector to a second physical sector in the unit area specified as the access area from the first physical sector, to which the same logical sector as a logical sector assigned to the second physical sector is assigned, in one of the unit areas that was specified as the access area before the current access area has been specified.

In detail, the valid-area changing unit may perform data migration when data is read from a physical sector in one of the unit areas that was specified as the access area before the current access area has been specified after the access-area setting unit has dynamically specified one of the unit areas as the access area, or when a data write request for one of the unit areas that has been specified as the access area is submitted. In this case, a mode may be adopted, in which data migration is performed in either of the following cases: a case where data is read and a case where data is written. Moreover, whole data in one unit area may be migrated within a predetermined period of time after the access-area setting unit has dynamically specified one of the unit areas as the access area. Specifically, data may be migrated, for example, just after the access area has been changed, or when the storage medium has not been accessed for a predetermined period of time. In a case where data migration is performed intensively at a predetermined time in this way, it is preferable that data migration be performed in the background and, when external access to the storage medium occurs, data migration be suspended, and a transaction corresponding to the external access be preferentially performed.

In detail, the valid-area changing unit may generate and store valid area information in a memory, the valid area information specifying a physical sector in which the latest data is written among physical sectors to which the same logical sector is assigned in individual unit areas that were specified as the access area before the current access area has been specified, and may update the valid area information upon migrating the latest data so that the valid area information represents a physical sector to which the latest data has been migrated. Moreover, when a data read request is submitted, the addressing unit may determine a physical sector in which the latest data is written with reference to the valid area information and may specify the physical sector as an access address.

The foregoing control functions may be implemented on a channel between the CPU, which issues read and write instructions, and the storage unit. Thus, other than the foregoing case where the control apparatus is provided, the control functions may be implemented as the functions of a disk controller in a computer or the functions of a control circuit in the storage unit. In any of the foregoing configurations, the storage unit may be of an internal type or an external type.

Moreover, the present invention may be implemented as a control apparatus that controls access to a storage medium. The control apparatus includes access-area setting means for dynamically specifying at least one of a plurality of storage areas as an access area, the at least one storage area being predetermined, address-translating means for updating a first address of write access with a second address of the access area specified by the access-area setting means, and storage-area changing means for, at predetermined time, migrating data corresponding to the write access to the access area specified by the second address from one of access areas that were already specified before the current access area has been specified.

The present invention may be viewed as a method for controlling a storage unit. In this method, one of the unit areas, in which logical sectors are assigned to respective physical sectors, is first dynamically specified as an access area for data. Then, in a case where a data write request for the storage area is submitted, a first address specified as a write address in the data write request is updated with a second address that represents a physical sector corresponding to a logical sector associated with the first address in the unit area specified as the access area. Then, whole data, including data that is read from a third physical sector in one of the unit areas that was specified as the access area before the current access area has been specified, for a fourth physical sector is migrated to the fourth physical sector, to which the same logical sector as a logical sector assigned to the third physical sector is assigned, in the unit area, which has been specified as the access area, when the data is read from the third physical sector after the unit area has been dynamically specified as the access area.

Moreover, the present invention may be implemented as a program that controls a computer to perform the functions of the foregoing control apparatus or a program that causes a computer to perform the individual steps in the foregoing control method. The program may be provided by distributing a magnetic disk, an optical disk, a semiconductor memory, or other storage media, in which the program is stored, or distributing the program via networks.

Moreover, the present invention may be viewed as the following storage medium. In this storage medium, a plurality of unit areas of the same storage capacity is provided in at least a part of a storage area. Predetermined unit areas of the unit areas include a plurality of first physical sectors that store predetermined data. The other unit areas of the unit areas correspond to the first physical sectors, which constitute the predetermined unit areas, and include a plurality of second physical sectors that are used as sectors to which the data stored in the first physical sectors is migrated.

In the present invention implemented with the foregoing configurations, the life of a storage unit can be extended and a decrease in the reliability due to a deterioration in the properties of a storage medium can be prevented by effectively preventing the fixed-position floating status of a head from staying, for a long period of time, in the control operation of the storage unit.

BRIEF DESCRIPTION OF THE DRAWINGS

FIG. 4 is a table showing the relationships among unit areas A(0) to A(6), logical sectors S(0) to S(9), and addresses assigned to the individual logical sectors in the present embodiment.

FIG. 6 is a drawing showing the status in which a unit area to which data is written and a valid area in the adjustment target area in the magnetic disk are changed in the present embodiment, and the status at time 0.

FIG. 7 is a drawing showing the status in which a unit area to which data is written and a valid area in the adjustment target area in the magnetic disk are changed in the present embodiment, and the status when time period t has elapsed.

FIG. 8 is a drawing showing the status in which a unit area to which data is written and a valid area in the adjustment target area in the magnetic disk are changed in the present embodiment, and the status in which data has been written after the status shown in FIG. 7.

FIG. 9 is a drawing showing the status in which a unit area to which data is written and a valid area in the adjustment target area in the magnetic disk are changed in the present embodiment, and the status in which data has further been written after the status shown in FIG. 8.

FIG. 10 is a drawing showing the status in which a valid area in the adjustment target area in the magnetic disk is changed in the present embodiment, and the status when the time period t has further elapsed after the status shown in FIG. 7.

DETAILED DESCRIPTION OF THE PREFERRED EMBODIMENTS

In the control of access to a storage unit according to the present embodiment, data is read and written while an area for storing certain information is being dynamically moved. When the storage area is moved, the position of a head above a storage medium is changed in a case where certain information is accessed. This prevents the fixed-position floating status of the head above the storage medium. In the present embodiment, data is not distributed across a storage medium by controlling the write address of the data, but the location of a storage area to which certain data is written is dynamically changed. Thus, there is no slowdown in the performance of the storage unit caused by distribution of relevant data across the storage medium. Although the storage area can be moved at any time, this is control for preventing the fixed-position floating status of the head from being kept for a long period of time. Thus, it is preferable that the storage area be periodically moved.

Recently, the storage capacity of a magnetic disk unit has been dramatically increased with the development of technology. On the other hand, since types of transaction performed by a built-in computer for a specific application, such as the aforementioned ATM, are almost fixed, the storage capacity of a magnetic disk unit required for performing transactions has hardly been changed. Thus, in a magnetic disk unit in such a built-in computer, the surplus storage capacity of the magnetic disk unit is not efficiently used. Accordingly, in the present embodiment, the aforementioned movement control of a storage area is performed using the surplus storage capacity.

The present embodiment will now be described with an exemplary case where a magnetic disk unit in which a hard disk is used as a storage medium is an object. Even in other types of storage unit in which, for example, an optical disk is used as a storage medium, needless to say, the present embodiment can be applied to solve, for example, a problem caused by the fixed-position floating status of a head or a problem caused by concentration of access to a certain area.

Figure 1:
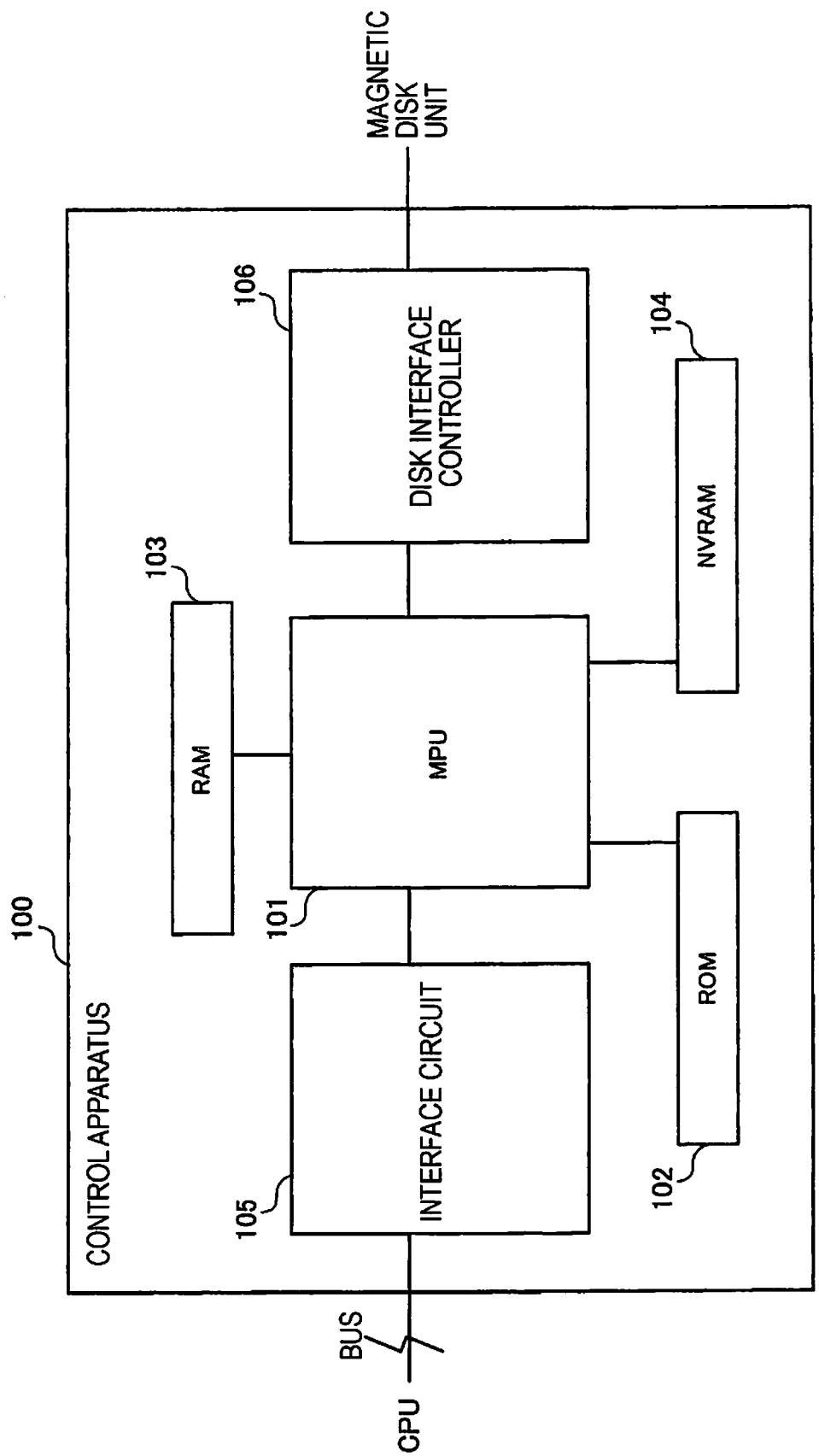
FIG. 1 is a drawing showing an exemplary hardware configuration of a control apparatus according to the present embodiment.

Referring now to FIG. 1. The control apparatus 100 according to the present embodiment includes a micro processing unit (MPU) 101 that is processing means and a read only memory (ROM) 102, a random access memory (RAM) 103, and a nonvolatile RAM (NVRAM) 104 that are memory means. The control apparatus 100 intervenes between a central processing unit (CPU) and a magnetic disk unit in a computer and controls access (data read and write) of the CPU to the magnetic disk unit. Thus, the control apparatus 100 includes an interface circuit 105 that connects to hardware on the CPU side via a bus and a disk interface controller 106 that connects to the magnetic disk unit.

In FIG. 1, the MPU 101 translates an access address in the logical block addressing (LBA) mode to that in the cylinder/head/sector (CHS) mode in response to an access request from the CPU and controls data read and write for a magnetic disk unit. In the present embodiment, switching control of a storage area assigned to predetermined data is performed. The details of switching control of a storage area are described below.

The ROM 102 stores microcode for controlling the MPU 101. The RAM 103 is a memory that provides a work area that is used when the MPU 101 performs processing. The NVRAM 104 stores various settings that are used in the processing in the MPU 101. In the present embodiment, the NVRAM 104 also stores information that is used in the aforementioned switching control of a storage area. The details of this information are described below.

The concept of access control according to the present embodiment for magnetic disk units will now be described with specific examples. A magnetic disk unit used in a built-in computer for a specific application will be examined. It is assumed that a transaction-processing apparatus implemented with this built-in computer monitors the status of the apparatus, maintains the log, and writes the log to the magnetic disk unit in addition to regular transactions. The log is periodically written even while the transaction-processing apparatus is not processing regular transactions. Thus, when regular transactions are not processed for a long period of time, the magnetic head of the magnetic disk unit is continuously used for writing the log.

Moreover, it is assumed that the magnetic disk unit has a storage capacity of thirty gigabytes (GBs), and the amount of a storage area required for storing programs and processing, for example, data read and write, in regular transactions is 10 GB. In this case, the amount of a surplus storage area is 20 GB. The storage area of 20 GB is treated as an adjustment target area used for the movement control of a storage area, according to the present embodiment, to prevent the problem due to fixed-position floating status. The aforementioned log write operation is performed on the adjustment target area.

Figure 2:
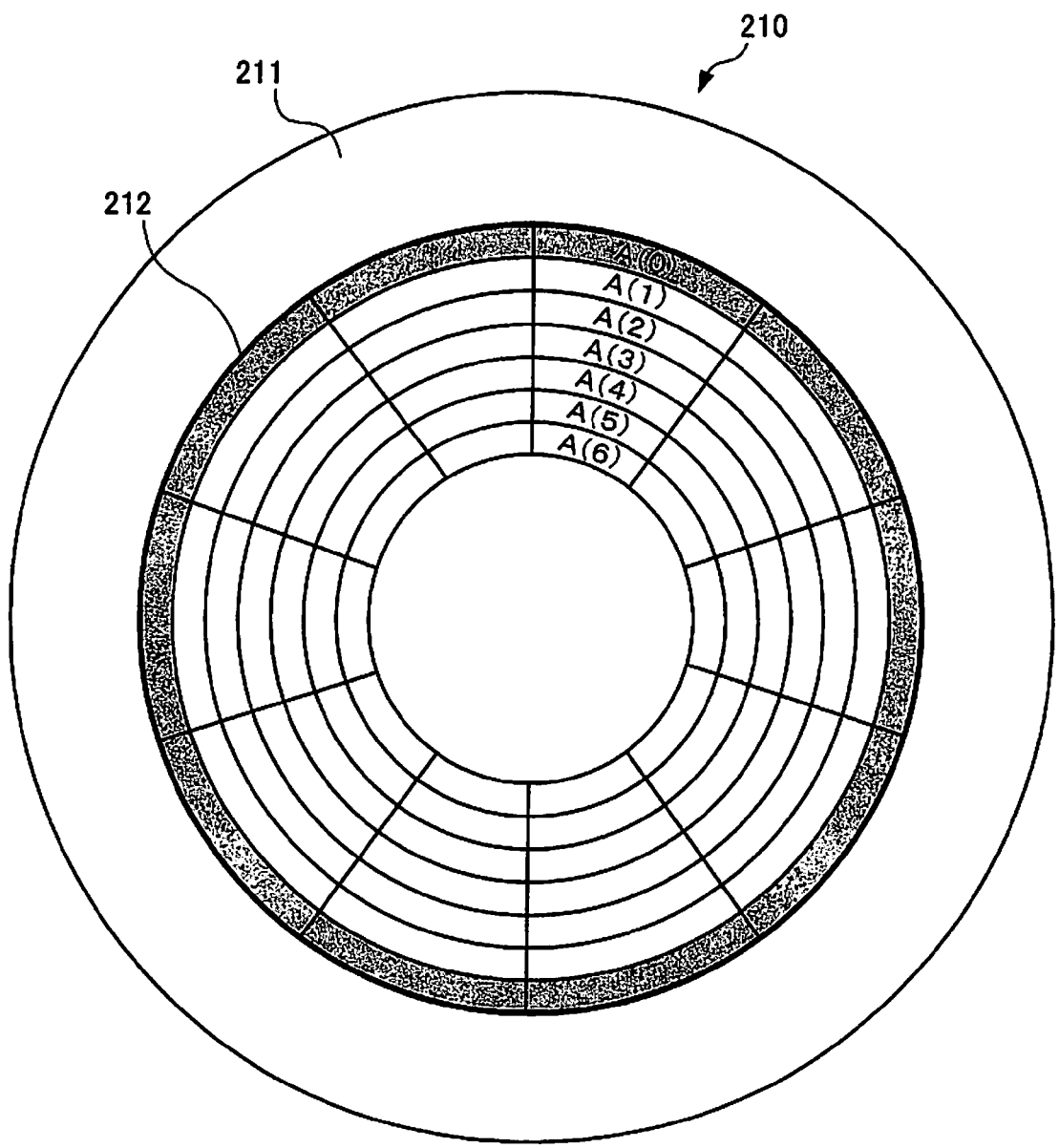
FIG. 2 is a drawing showing an exemplary structure of a storage area of a magnetic disk in a magnetic disk unit that is subjected to control according to the present embodiment.

Referring now to FIG. 2. An outer 10-GB part of the whole storage area of a magnetic disk 210 is an area (hereinafter called a regular area 211) used for, for example, storing programs or transaction processing, and an inner 20-GB part is an adjustment target area 212. Here, it is assumed that logical sectors that are frequently accessed for, for example, recording the log are ten sectors S(0) to S(9) (not shown).

The adjustment target area 212 is partitioned into seven unit areas A(0) to A(6), each being a unit for storing data (log) to be written to the adjustment target area 212. Each unit area includes a group of ten physical sectors. The ten logical sectors S(0) to S(9) are assigned to each of the unit areas A(0) to A(6), for example, the area A(0) (a gray area in FIG. 2). In other words, the adjustment target area 212 includes seven (seven concentrically arranged) unit areas each including ten physical sectors to which respective ten logical sectors are assigned. That is to say, seven physical storage areas (corresponding to the unit areas A(0) to A(6)) are provided for each of the logical sectors S(0) to S(9).

Figure 3:
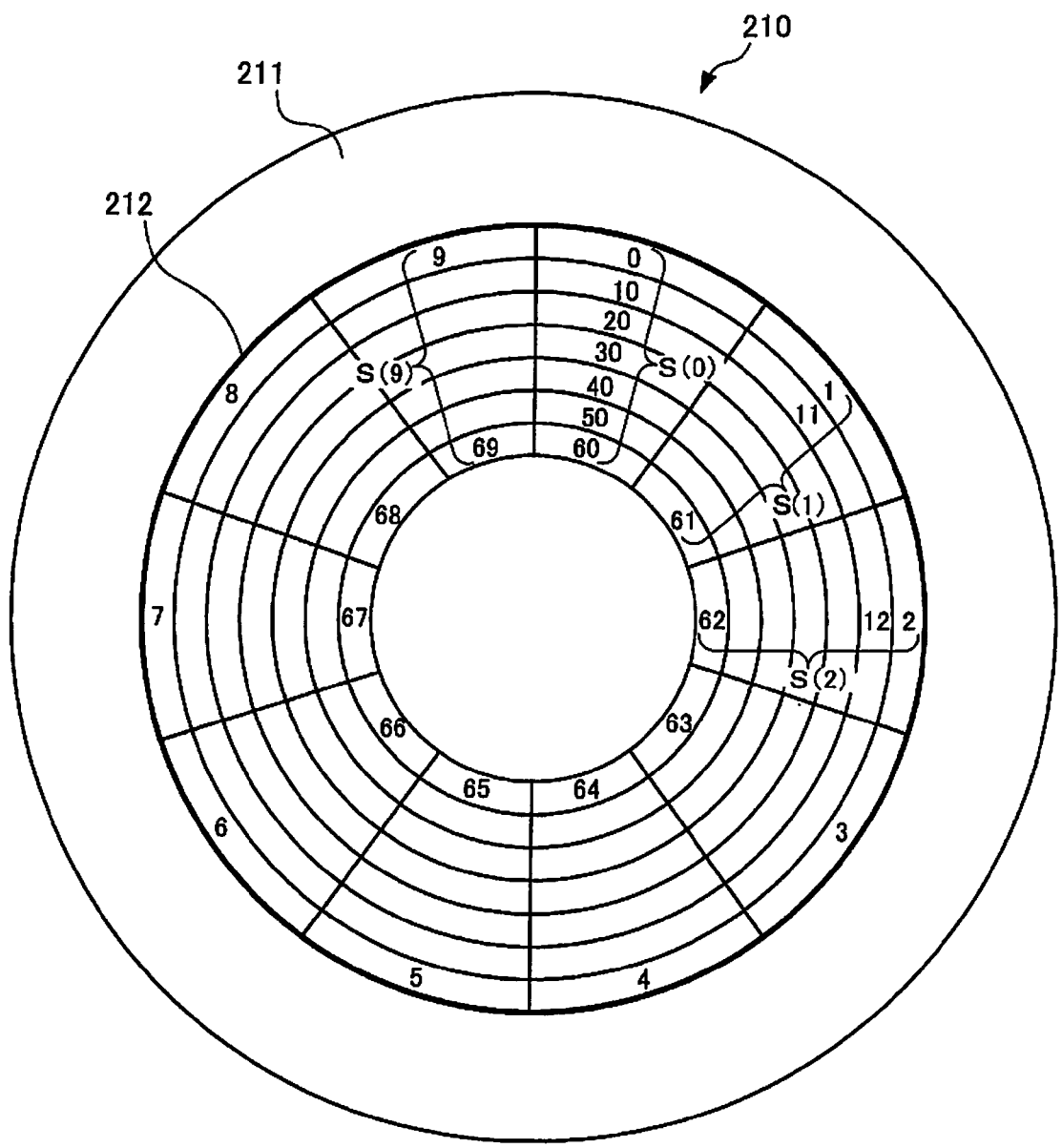
FIG. 3 is a drawing showing the further details of an adjustment target area in the magnetic disk shown in FIG. 2.

Referring now to FIG. 3. Addresses 0 to 69 in the LBA mode are assigned to the respective physical sectors in the adjustment target area 212, starting from the physical sector corresponding to the logical sector S(0) in the unit area A(0) (however, only addresses 0 to 12, 20, 30, 40, 50, and 60 to 69 are shown in the drawing). Thus, on the basis of the aforementioned relationships between the unit areas A(0) to A(6) and the logical sectors S(0) to S(9), the unit area A(0) includes physical sectors at addresses 0 to 9, the unit area A(1) includes physical sectors at addresses 10 to 19, the unit area A(2) includes physical sectors at addresses 20 to 29, the unit area A(3) includes physical sectors at addresses 30 to 39, the unit area A(4) includes physical sectors at addresses 40 to 49, the unit area A(5) includes physical sectors at addresses 50 to 59, and the unit area A(6) includes physical sectors at addresses 60 to 69.

Referring now to FIG. 4. FIG. 4 is a table showing the correspondences between the unit areas A(0) to A(6) and the logical sectors S(0) to S(9) in addresses, in the LBA mode, of the physical sectors assigned to the individual logical sectors.

In the present embodiment, the movement control of a storage area is implemented by moving data between physical sectors corresponding to each other in the unit areas A(0) to A(6), which are provided so as to be concentrically arranged, as described above. Thus, for example, in FIG. 4, data written to the logical sector S(3) in a certain unit area is migrated between physical sectors at addresses 3, 13, 23, 33, 43, 53, and 63 in predetermined order.

In the example shown in FIGS. 2 and 3, one unit area is assigned to one track, and each of the logical sectors S(0) to S(9) assigned to each of the unit areas A(0) to A(6) is shown at the same position on each track, for the sake of simplification (for example, in FIG. 3, the addresses of physical sectors, corresponding to the logical sector S(0), in the unit areas A(0) to A(6) are 0, 10, 20, 30, 40, 50, and 60, and each address is shown at the same position on each track). However, needless to say, the arrangement of unit areas, the setting of physical sectors, and the like are not limited to the arrangement shown in the drawings. Actually, since physical sectors are set up so that the recording density is constant regardless of the distance from the center of the magnetic disk 210, unit areas are also arranged in sequential order regardless of tracks of the magnetic disk 210. Moreover, the number of unit areas and the number of physical sectors assigned to one unit area are not limited to those shown in the drawings and may be freely determined in a manner that depends on, for example, the storage capacity of the adjustment target area 212 or the amount of data to be stored in the adjustment target area 212. When a plurality of physical sectors is assigned to a unit area, it is preferable that the physical sectors be contiguous to prevent a slowdown in the performance.

In the above description, it is assumed that equivalent seven unit areas are provided in the adjustment target area 212 in the magnetic disk 210 for storing a predetermined type of data. Other than this configuration, for example, a configuration of the adjustment target area 212 in the magnetic disk 210 may be set, in which main unit areas for storing the predetermined type of data and migration unit areas for migrating the data stored in the main unit areas are provided. In this case, the migration unit areas have the same storage capacity and the same number of physical sectors as the main unit areas. The individual physical sectors in the migration unit areas correspond to the physical sectors that constitute the main unit areas and are used as areas to which data stored in the corresponding physical sectors in the main unit areas is migrated. In the description, the addressing of the magnetic disk was the CHS (cylinder number/head number/sector number) addressing. However, a similar configuration can be implemented with another addressing method, for example, the LBA addressing.

In the present embodiment, the following two types of information are set to perform movement control, according to the present embodiment, of a storage area for the magnetic disk unit having the above configuration. One type of information is valid area information VA(i) that represents which unit area stores data in each logical sector. Another type of information is access area information Wa that specifies which unit area data is to be written to. That is to say, when data is written to the adjustment target area 212 in the magnetic disk 210, the data is written to a corresponding physical sector in a unit area specified by the access area information Wa. When data is read, the data is read from a corresponding physical sector in a unit area represented by the valid area information VA(i). The valid area information VA(i) and the access area information Wa are stored and retained in, for example, the NVRAM 104 in the control apparatus 100 shown in FIG. 1.

Figure 5:
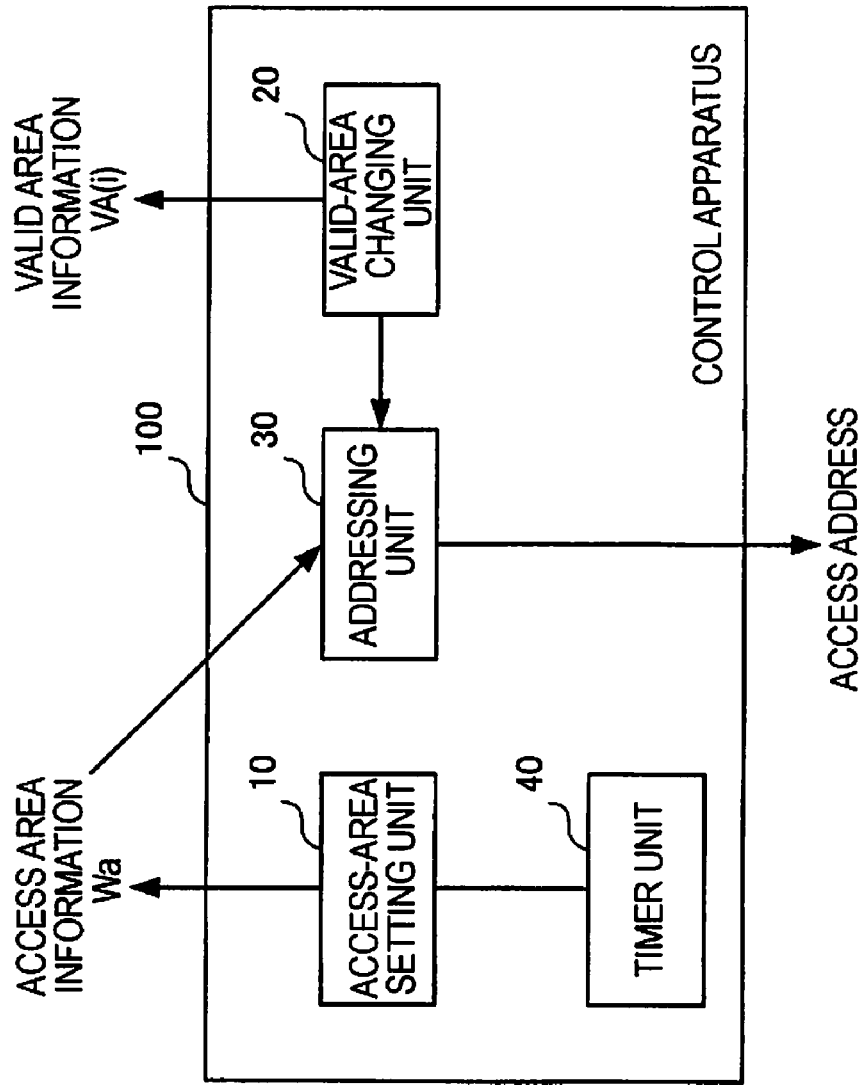
FIG. 5 is a drawing showing the functional structure of the control apparatus according to the present embodiment.

Referring now to FIG. 5. The control apparatus 100 includes an access-area setting unit 10, a valid-area changing unit 20, an addressing unit 30, and a timer unit 40, as shown in FIG. 5. These functions are implemented by the MPU 101 controlled by the microcode stored in the ROM 102 in the configuration shown in FIG. 1.

The access-area setting unit 10 sets the access area information Wa, which specifies a unit area (hereinafter called an access area) to be accessed for data in the aforementioned adjustment target area 212 in the magnetic disk 210.

The valid-area changing unit 20 changes a unit area (hereinafter called a valid area) that stores data in the aforementioned adjustment target area 212 in the magnetic disk 210. That is to say, when a new write request has been submitted, an address to which data is actually written is specified. The valid area can be changed, for example, periodically or when write operation has continued only on the adjustment target area 212 for a predetermined period of time. Moreover, the valid-area changing unit 20 updates the aforementioned valid area information VA(i) upon changing the valid area so that the valid area information VA(i) represents a unit area (an area to which data is migrated) that has become a new valid area.

Moreover, the valid-area changing unit 20 migrates data written to the adjustment target area 212 at appropriate time after changing the valid area. In one embodiment, when data written to the adjustment target area 212 has been read, the read data is written to a unit area that has become a new valid area. Other than this, data may be migrated, for example, just after the valid area is changed, when new data is written to a new valid area, or during idle time during which no access occurs for a predetermined period of time. However, in these cases, since concentration of access to the magnetic disk 210 due to data migration may slow down the performance of external access, an appropriate measure needs to be taken. When the aforementioned method for migrating data upon reading the data is adopted, no concentration of access to the magnetic disk 210 due to data migration occurs in the first place.

The addressing unit 30 updates an access address of a read/write instruction for the adjustment target area 212 in the magnetic disk 210 on the basis of the access area information Wa and the valid area information VA(i). That is to say, when a request for writing data to the adjustment target area 212 has been submitted, the addressing unit 30 updates the write address of this write request with the address of a corresponding physical sector in an access area with reference to the aforementioned access area information Wa. Moreover, when a request for reading data written to the adjustment target area 212 has been submitted, the addressing unit 30 specifies a corresponding physical sector in a valid area as the access address of this read request with reference to the aforementioned valid area information VA(i).

The timer unit 40 is used to determine timing for the access-area setting unit 10 to update the access area information Wa.

The operation of access control by means of the control apparatus 100 and the magnetic disk unit having the aforementioned configurations will now be described.

FIGS. 6 to 10 are drawings showing the movement of a unit area to which data is written and a valid area in the adjustment target area 212 in the magnetic disk 210 in the present embodiment.

In this exemplary operation, it is assumed that data is written to the seven unit areas A(0) to A(6) at intervals of time period t (s) while an access area is sequentially moved, using the example of the magnetic disk unit shown in FIGS. 2 to 4.

It is assumed that the time period t is short enough to prevent the problem due to fixed-position floating status.

Although the access area can be moved in any manner, it is preferable that the distance traveled by the magnetic head when the access area is changed be much larger than the width of the slider of the magnetic head to prevent the problem due to fixed-position floating status. In the example shown in FIG. 2, the unit areas A(0) to A(6) are sequentially arranged. Thus, in a case where the access area is moved in order of A(0), A(4), A(1), A(5), A(2), A(6), A(3), A(0), . . . (one cycle is formed by A(0) to A(3) and repeated), every time the access area is changed, the magnetic head surely travels distance corresponding to three or more unit areas. Thus, in this exemplary operation, it is assumed that the valid area is changed in this order.

In the example shown in FIG. 2, one unit area corresponds to one track. Thus, when the valid area is moved, the magnetic head travels distance corresponding to three or more tracks in the aforementioned movement order. However, the size of one unit area actually has no relation to the tracks of the magnetic disk 210, as described above. Thus, the moving distance of the magnetic head varies with systems.

The exemplary operation will now be described in chronological order with reference to FIGS. 6 to 10. In FIGS. 6 to 10, physical sectors in a valid area, to which data is actually written, are diagonally shaded to distinguish these physical sectors from other physical sectors.

The access-area setting unit 10 in the control apparatus 100 initially sets the unit area A(0) as a write area (at time 0). In FIG. 6 showing the status at time 0, the data access area information Wa is set to zero (the area number of the unit area A(0)). Thus, until the time period t has elapsed from this point of time, the addressing unit 30 specifies addresses 0 to 9 of corresponding physical sectors in the unit area A(0), which has been set in the access area information Wa, as write addresses corresponding to a request for writing data to the adjustment target area 212.

In the initial status, a valid area, for all of the logical sectors S(0) to S(9), is the unit area A(0). Thus, the valid area information VA(i) is linked to addresses 0 to 9 of the logical sectors S(0) to S(9) assigned to the unit area A(0).

When the time period t has elapsed, the access-area setting unit 10 changes the access area information Wa to four (the area number of the unit area A(4)), as shown in FIG. 7. Thus, until the time period t has further elapsed from this point of time, the addressing unit 30 specifies addresses 40 to 49 of corresponding physical sectors in the unit area A(4), which has been set in the access area information Wa, as write addresses corresponding to a request for writing data to the adjustment target area 212.

However, at the point of time shown in FIG. 7, new data has not been written, and all data that was written remains in the physical sectors in the unit area A(0). Thus, the valid area information VA(i) is linked to addresses 0 to 9 of the logical sectors S(0) to S(9) of the unit area A(0).

Then, data is written to the logical sectors S(1) and S(7) after the status has changed to that shown in FIG. 7. The status at this point of time is shown in FIG. 8. The addressing unit 30 specifies addresses 41 and 47 of the logical sectors S(1) and S(7) in the unit area A(4), which has been set in the access area information Wa, as addresses to which data is written, as described above. Thus, data is written to physical sectors having addresses 41 and 47. When new data has been written, the valid-area changing unit 20 changes the corresponding valid area.

That is to say, after new data has been written to addresses 41 and 47 of the physical sectors in the unit area A(4), the valid-area changing unit 20 updates the valid area information VA(i) for the logical sectors S(1) and S(7), as shown in the column of VA(i) in FIG. 8, and links the valid area information VA(i) to addresses 41 and 47 of the logical sectors S(1) and S(7) in the unit area A(4).

FIG. 9 shows the status after data has been further written to the logical sectors S(2) to S(4), S(6), and S(9) in the status shown in FIG. 8.

New data is recorded in addresses 42 to 44, 46, and 49 of corresponding physical sectors in the unit area A(4), as in the operation described with reference to FIG. 8. The valid area information VA(i) is also updated and linked to addresses 42 to 44, 46, and 49 of the logical sectors S(2) to S(4), S(6), and S(9) in the unit area A(4), as shown in the column of VA(i) in FIG. 9.

At this point of time after the access area information Wa has been changed to four, no data has not been written to the logical sectors S(0), S(5), and S(8). Thus, the valid area for these logical sectors remains the unit area A(0), and the valid area information VA(i) remains linked to addresses 0, 5, and 8 of the logical sectors S(0), S(5), and S(8) in the unit area A(0), as shown in the column of VA(i) in FIG. 9.

A case will now be examined, where data is written to the logical sectors S(1) to S(6), S(8), and S(9) after the time period t has further elapsed from the point of time shown in FIG. 7. The status at this point of time is shown in FIG. 10. The access area information Wa has been changed to one (the area number of the unit area A(1)) by the access-area setting unit 10. Thus, the addressing unit 30 specifies addresses 10 to 19 of corresponding physical sectors in the unit area A(1), which has been set in the access area information Wa, as write addresses corresponding to a request for writing data to the adjustment target area 212.

Since data has been written to the logical sectors S(1) to S(6), S(8), and S(9), new data corresponding to the write request has been recorded in addresses 11 to 16, 18, and 19 of corresponding physical sectors in the unit area A(1). Then, the valid-area changing unit 20 updates the valid area information VA(i), so that the valid area information VA(i) is linked to addresses 11 to 16, 18, and 19 of the logical sectors S(1) to S(6), S(8), and S(9) in the unit area A(1), as shown in the column of VA(i) in FIG. 10.

Regarding the logical sectors S(5) and S(8), new data was not written at the point of time shown in FIG. 9. Thus, when data is written to the logical sectors S(5) and S(8) after the access area information Wa has been changed to one, the valid area information VA(i) is updated so that addresses 5 and 8 of the logical sectors S(5) and S(8) in the unit area A(0) are changed to addresses 15 and 18 of the logical sectors S(5) and S(8) in the unit area A(1) (that is to say, not through the unit area A(4)).

After the access area information Wa has been changed to one, the logical sector S(7) has not been accessed at this point of time. Thus, the valid area for this logical sector remains the unit area A(4), and the valid area information VA(i) also remains linked to address 47 of the logical sector S(7) in the unit area A(4). Moreover, after the access area information Wa was changed to four at the point of time shown in FIG. 7, new data has not been written to the logical sector S(0). Thus, the corresponding valid area remains the unit area A(0), and the valid area information VA(i) also remains linked to address 0 of the logical sector S(0) in the unit area A(0).

Even when data is continuously written to the adjustment target area 212 in the magnetic disk 210, the magnetic head can be prevented from staying at a certain position above the magnetic disk 210 by repeating the foregoing operation.

When a request for reading data written in the adjustment target area 212 has been submitted, the addressing unit 30 obtains the address of a physical sector in which the data is currently recorded with reference to the valid area information VA(i) and specifies the address as an access address corresponding to this read request. For example, when a read request has been submitted at the point of time shown in FIG. 8, the addressing unit 30 specifies addresses 0, 2 to 6, 8, and 9 of corresponding physical sectors in the unit area A(0) for the logical sectors S(0), S(2) to S(6), S(8), and S(9), and addresses 41 and 47 of corresponding physical sectors in the unit area A(4) for the logical sectors S(1) and S(7) as access addresses. Moreover, when a read request has been submitted at the point of time shown in FIG. 10, the addressing unit 30 specifies address 0 of a corresponding physical sector in the unit area A(0) for the logical sector S(0), addresses 11 to 16, 18, and 19 of corresponding physical sectors in the unit area A(1) for the logical sectors S(1) to S(6), S(8), and S(9), and address 47 of a corresponding physical sector in the unit area A(4) for the logical sector S(7) as access addresses. After data has been read from a specified address, the valid-area changing unit 20 records the read data to a new address specified by the write access area information Wa (data migration) and updates the valid area information VA(i). This series of processing can be thought of as processing in which data in an address specified by the valid area information VA(i) is migrated to an address specified by the write access area information Wa.

In a method for individually migrating read data to a new valid area when the data has been read, data migration is not performed for a physical sector, data in the physical sector having not been accessed (read), as described above. However, no access to a physical sector means that the magnetic head does not move to the physical sector. Thus, the problem due to fixed-position floating status does not occur.

Various timings of migrating data may be adopted, other than the foregoing timing of migrating data when data written in the adjustment target area 212 has been read. For example, when the valid-area changing unit 20 has changed the valid area, before corresponding addresses are accessed, data recorded in individual physical sectors in a unit area that has been the valid area till then can be unconditionally migrated to corresponding physical sectors in another unit area that has been newly specified as the valid area. Alternatively, data may be migrated in the background during idle time during which no access occurs for a predetermined period of time. In this case, when access occurs in the middle of migrating data, data migration is suspended, and a transaction corresponding to the access request is preferentially performed to prevent a slowdown in the performance of external access. Alternatively, after the valid-area changing unit 20 has changed the valid area, when a request for writing data to a certain physical sector in the access area has been submitted, data may be individually migrated to the physical sector. In this case, data is first read from a physical sector (having an address specified in the valid area information VA(i)) that is specified as a physical sector to which data is to be written in a write request and currently stores the data. Then, the data, together with new data corresponding to the write request, is written to a corresponding physical sector in a unit area specified in the access area information Wa.

Exemplary configurations of computer systems that include the foregoing control apparatus 100 will now be described.

Figure 11:
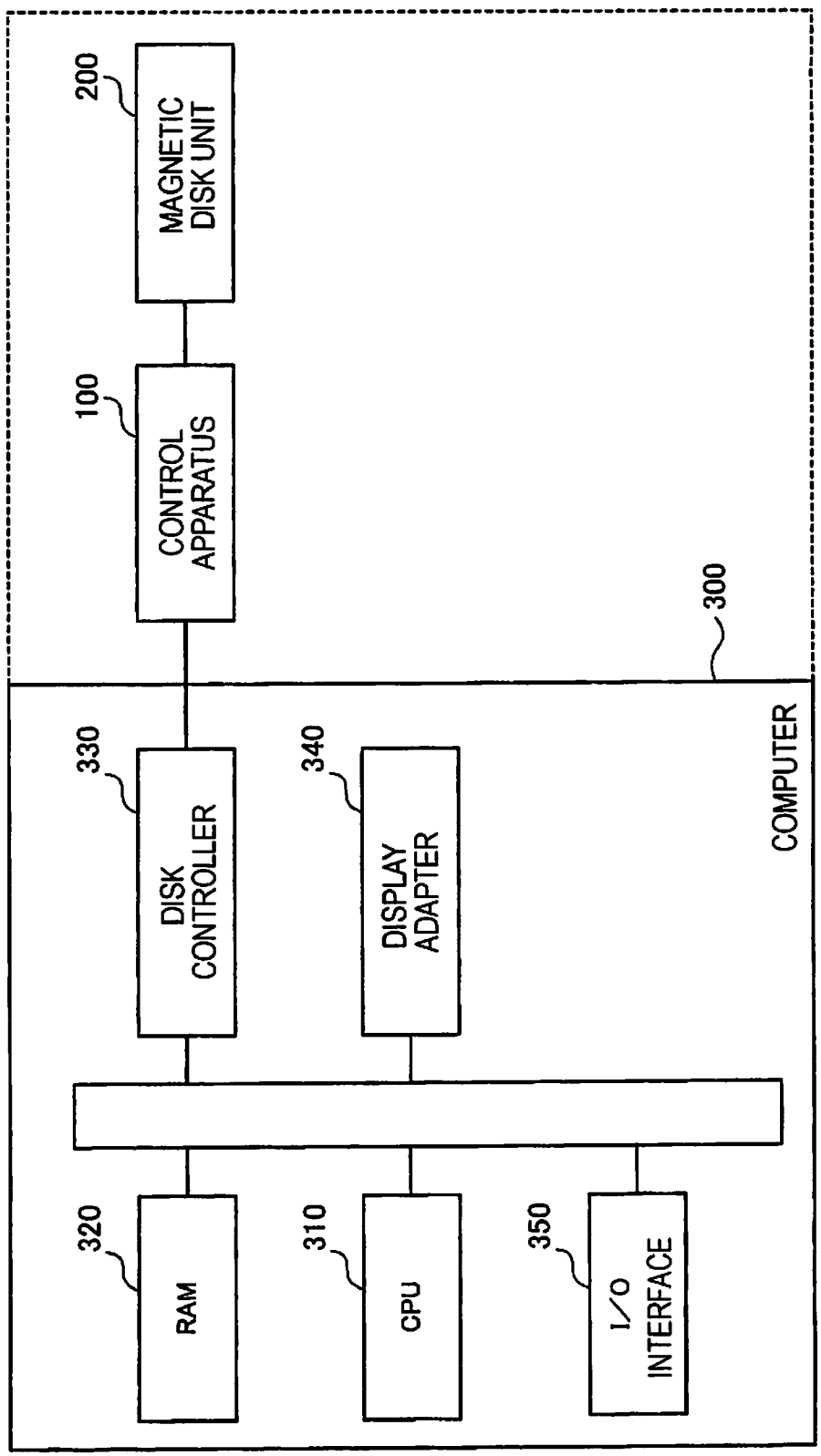
FIG. 11 is a drawing showing an exemplary configuration of a system that includes the control apparatus according to the present embodiment.

Referring now to FIG. 11. In the example shown in the drawing, the system includes a computer 300 and a magnetic disk unit 200. The computer 300 includes a CPU 310 that is control means, a RAM 320 that is main memory means, a disk controller 330 for connecting to the magnetic disk unit 200, which is external storage means, a display adapter 340 for connecting to a display unit that is display means, and an I/O interface 350 to which other peripherals are connected. The control apparatus 100, which is separated from the computer 300, intervenes between the magnetic disk unit 200 and the disk controller 330. The interface between the disk controller 330 and the control apparatus 100 and the interface between the control apparatus 100 and the magnetic disk unit 200 may be of any type, for example, IDE, SCSI, USB, Serial ATA, or Fiber, and the type is not restricted.

In the configuration shown in FIG. 11, the disk controller 330 performs regular control for reading and writing data from and to a controller in the magnetic disk unit 200, for example, address translation between LBA and CHS in an access request from the CPU 310, and the control apparatus 100 performs control for, for example, specifying an access area and changing a valid area when reading and writing data from and to the adjustment target area 212 in the magnetic disk 210.

In this way, the control apparatus 100, which is separated from the computer 300, intervenes between the magnetic disk unit 200 and the disk controller 330 so that the control apparatus 100 only performs control for reading and writing data from and to the adjustment target area 212. Thus, installation in an existing system is greatly facilitated. In FIG. 11, the magnetic disk unit 200 may be of an internal type or an external type. Moreover, the control apparatus 100 may be built in the computer 300 or externally attached to the computer 300.

Figure 12:
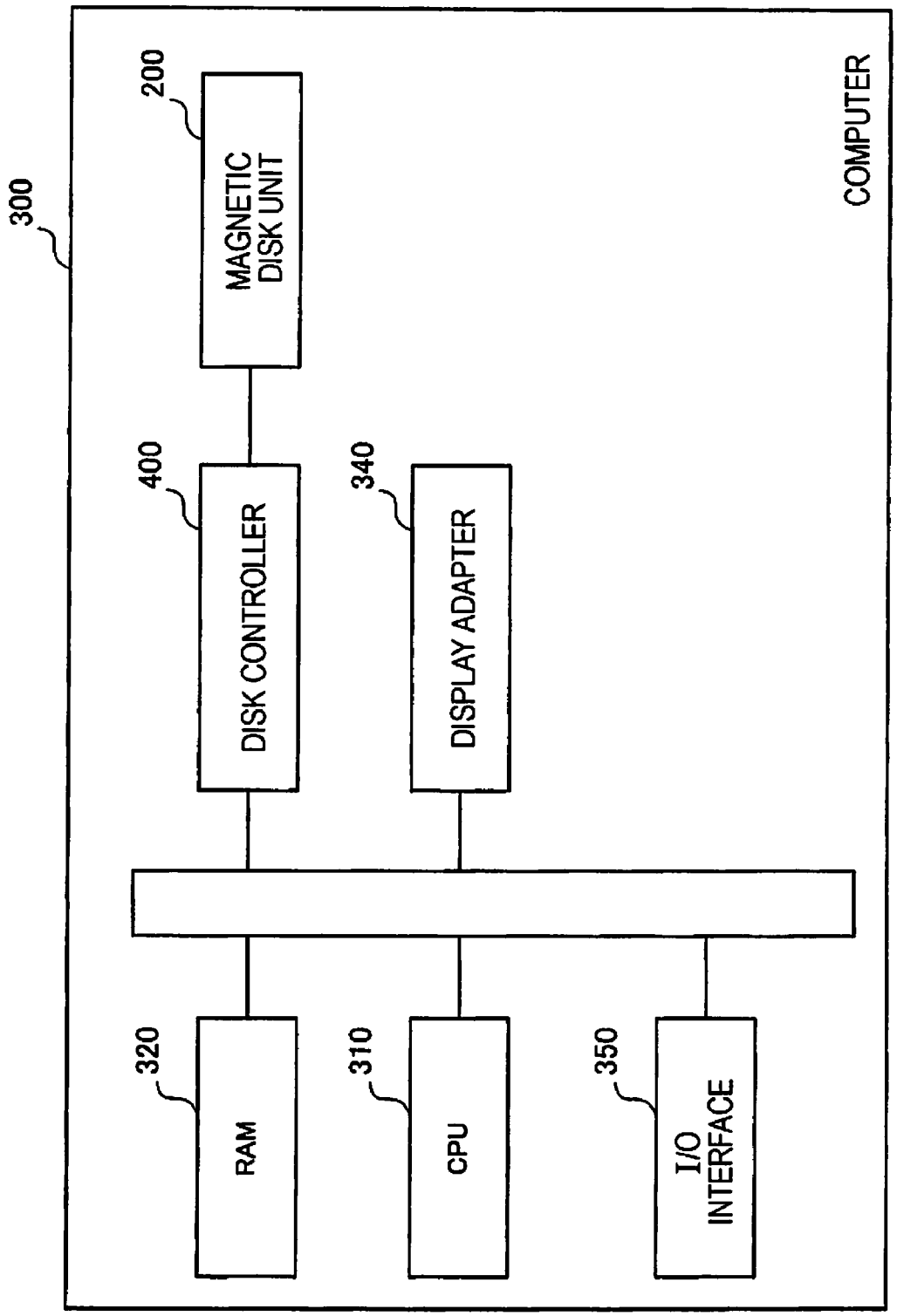
FIG. 12 is a drawing showing another exemplary configuration of a system that includes the control apparatus according to the present embodiment.

Referring now to FIG. 12. In the example shown in the drawing, the system includes the computer 300 and the magnetic disk unit 200. The computer 300 includes the CPU 310, which is control means, the RAM 320, which is main memory means, a disk controller 400 for connecting to the magnetic disk unit 200, which is external storage means, the display adapter 340 for connecting to a display unit that is display means, and the I/O interface 350, to which other peripherals are connected. The disk controller 400 has the functions of the foregoing control apparatus 100 according to the present embodiment.

When a configuration as in FIG. 12 is adopted, the disk controller 400 performs the foregoing control according to the present embodiment for reading and writing data from and to the adjustment target area 212 in addition to regular control for reading and writing data from and to the magnetic disk unit 200. The hardware configuration of the disk controller 400 may be similar to that of the control apparatus 100 shown in FIG. 1. The individual control functions are implemented by the MPU 101 controlled by the microcode stored in the ROM 102. In the configuration shown in FIG. 12, the interface circuit 105 is a bus bridge circuit. In the configuration shown in FIG. 12, the magnetic disk unit 200 may be of an internal type or an external type (it is assumed in the drawing that the magnetic disk unit 200 is of an internal type).

Figure 13:
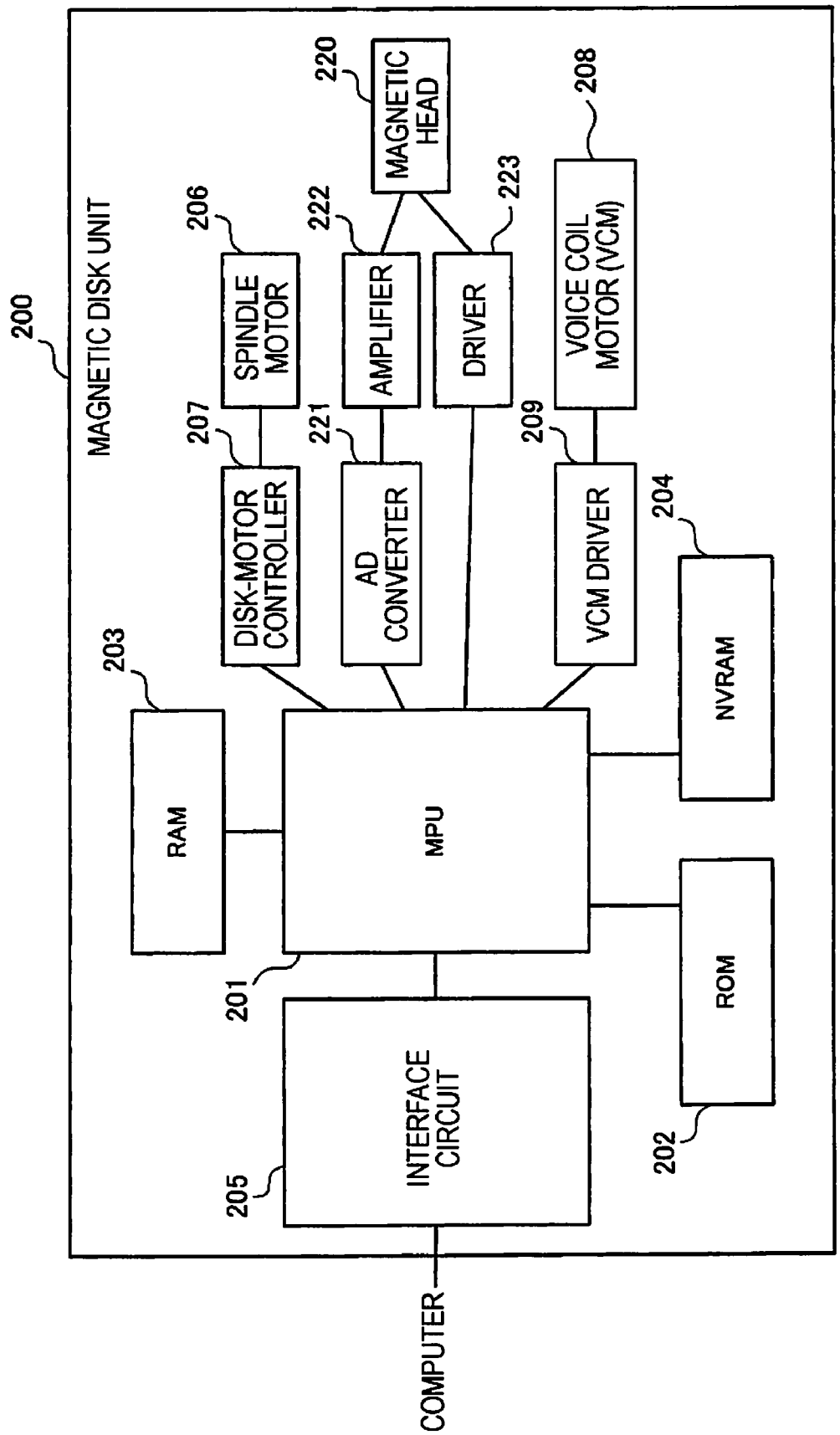
FIG. 13 is a drawing showing yet another exemplary configuration of a system that includes the control apparatus according to the present embodiment.

Referring now to FIG. 13. The functions of the foregoing control apparatus 100 according to the present embodiment are given to a control circuit in the magnetic disk unit 200. In FIG. 13, the magnetic disk unit 200 functioning as a control circuit includes an MPU 201 that is processing means, a ROM 202, a RAM 203, and a nonvolatile RAM (NVRAM) 204 that are memory means, and an interface circuit 205 for connecting to the disk controller 330 in the computer 300. The magnetic disk unit 200 further includes the magnetic disk 210 (not shown in FIG. 13), which is storage means, a magnetic head 220 for reading and writing data from and to the magnetic disk 210, a spindle motor 206 and a disk-motor controller 207 for rotating the magnetic disk 210, and a voice coil motor (VCM) 208 and a VCM driver 209 for controlling the seek operation of the magnetic head 220. The magnetic disk unit 200 further includes an AD converter 221, an amplifier 222, and a driver 223 for reading and writing data from and to the magnetic disk 210 by means of the electromagnetism caused by the magnetic head 220.

In FIG. 13, the MPU 201 controls the operation of the magnetic disk 210 and the magnetic head 220 according to an instruction from the disk controller 330 in the computer 300 to read and write data. Moreover, the MPU 201 performs the foregoing control according to the present embodiment for reading and writing data from and to the adjustment target area 212 in the magnetic disk 210. These functions are implemented by the MPU 201 controlled by the microcode stored in the ROM 202. Thus, when a configuration as in FIG. 13 is adopted, new hardware need not be added, as in the configuration shown in FIG. 12, and the configuration can be implemented merely by changing the microcode stored in the ROM 202. The interface circuit 205 shown in FIG. 13 may be of any type, for example, IDE, SCSI, USB, Serial ATA, or Fiber, and the type is not restricted.

Furthermore, the functions according to the present embodiment for controlling access to the adjustment target area 212 in the magnetic disk 210 can be implemented as the functions of a device driver used by an operating system (OS) for the magnetic disk unit 200, not the foregoing functions of various types of controller. In this case, an access address in an access instruction for the magnetic disk unit 200 output from the CPU 310 in the computer 300 is an address (for example, an address in a unit area or a valid area, the address being set by the access-area setting unit 10) selected by the access control according to the present embodiment. When the functions according to the present embodiment are implemented as software in this way, the functions can be installed and used in a system merely by distributing the device driver without preparing special hardware.

The control functions according to the present embodiment may be implemented as hardware or software means on any channel of information between the CPU 310 in the computer 300 and the magnetic disk unit 200, as described above, and the foregoing configurations or other various types of configuration may be adopted as the specific configuration.

In the present embodiment, even when a storage unit keeps predetermined data write operation for a long period of time, the fixed-position floating status of a head can be prevented from keeping for a long period of time by appropriately moving an area to which data is written, as described above. Thus, the problem due to fixed-position floating status can be prevented.

Moreover, in the present embodiment, a plurality of unit areas is set up in an adjustment target area set up on a disk, and an area to which data is written is specified with a unit area being a unit. Thus, data to be written to one unit area is not distributed over the disk, thereby preventing a slowdown in the performance of reading and writing data. Pieces of data that have never been read or written are distributed. However, these pieces of data are migrated when the pieces of data are accessed in future. Thus, the influence of these pieces of data on the performance can disregarded.

Moreover, in the present embodiment, among the plurality of unit areas, a valid area to which data is written is dynamically changed according to predetermined rules. Thus, the fixed-position floating status of the head due to concentration of access to a certain unit area does not keep for a long period of time.

While the method, functions, and exemplary configurations for controlling access to the adjustment target area were described with exemplary control for the magnetic disk unit, which uses a magnetic disk as the storage medium, in the present embodiment, the method, functions, and exemplary configurations can be directly applied to various types of storage unit that have problems, such as a deterioration in the storage medium and a short life of the storage medium due to the fixed-position floating status of the head, for example, storage units that include an optical disk (for example, a DVD-RAM) to which data can be rewritten more than once as the storage medium.

Moreover, in the present embodiment, a storage area of a storage medium is divided into a regular area and an adjustment target area, a plurality of unit areas is provided in the adjustment target area, and data is written while an access area for data is being dynamically changed. Alternatively, the entire storage area of the storage medium may be used as the adjustment target area for, for example, some types or applications of systems.

Moreover, in the present embodiment, the access control is performed for one magnetic disk unit, an adjustment target area being provided in the magnetic disk. Alternatively, the access control according to the present embodiment may be performed for a plurality of magnetic disk units. In this case, adjustment target areas are appropriately provided for the magnetic disks in the plurality of magnetic disk units. The sizes of the adjustment target areas may vary with the magnetic disk units. The storage areas of the magnetic disks in the plurality of magnetic disk units may be handled as a logical sequence of contiguous storage areas, and the adjustment target areas may be provided so that the adjustment target areas extend across the plurality of magnetic disk units.

The invention claimed is:

1. A computer system comprising:
a central processing unit (CPU); and
a controller that is connected to an external storage unit and controls access to data by the CPU, the external storage unit including a storage area that includes a plurality of unit areas in at least a part of the storage area, each unit area being a respective discrete non-overlapping subdivision of said storage area and including a respective plurality of physical sectors,
wherein the controller comprises:
an access-area setting unit that dynamically specifies one of the unit areas, in which logical sectors of a set of logical sectors are assigned to respective physical sectors, as an access area for data, wherein for each of said unit areas, each physical sector within the respective unit area corresponds to a respective one of said logical sectors of said set of logical sectors;
an addressing unit that, in a case where the CPU submits a data write request for the external storage unit, updates a first address specified as a write address in the data write request with a second address that represents a physical sector, within the unit area specified as the access area by said access-area setting unit, which corresponds to a logical sector of said set of logical sectors associated with the first address, and
a valid-area changing unit that, at a predetermined time, migrates whole data in a first physical sector to a second physical sector, said second physical sector being within the unit area currently specified as the access area by said access-area setting unit, said first physical sector being within one of the unit areas that was specified as the access area before the unit area currently specified as the access area had been specified as the access area by said access-area setting unit, said first and second physical sectors corresponding to the same logical sector of said set of logical sectors.

2. The computer system according to claim 1, wherein, after the access-area setting unit has dynamically specified one of the unit areas as the access area, when data is read from a third physical sector in one of the unit areas that was specified as the access area before the current access area has been specified, the valid-area changing unit migrates whole data, including the read data, for a fourth physical sector to the fourth physical sector, to which the same logical sector as a logical sector assigned to the third physical sector is assigned, in the unit area, which has been specified as the access area.

3. The computer system according to claim 1, wherein, after the access-area setting unit has dynamically specified one of the unit areas as the access area, when a request for writing first data is submitted, before the first data is written, the valid-area changing unit migrates whole data in a third physical sector to a fourth physical sector, to which the first data needs to be written, in the unit area, which has been specified as the access area, from the third physical sector, to which the same logical sector as a logical sector assigned to the fourth physical sector is assigned, in one of the unit areas that was specified as the access area before the current access area has been specified.

4. The computer system according to claim 1, wherein, after the access-area setting unit has dynamically specified one of the unit areas as the access area, within a predetermined period of time, the valid-area changing unit migrates whole data in third physical sectors to respective fourth physical sectors in the unit area, which has been specified as the access area, from the third physical sectors, to which the same logical sectors as logical sectors assigned to the fourth physical sectors are assigned, in one of the unit areas that was specified as the access area before the current access area has been specified.

5. The computer system according to claim 1, wherein the valid-area changing unit generates and stores valid area information in a memory, the valid area information specifying a physical sector in which the latest data is written among physical sectors to which the same logical sector is assigned in individual unit areas that were specified as the access area before the current access area has been specified, and updates the valid area information upon migrating the latest data so that the valid area information represents a physical sector to which the latest data has been migrated.

6. A control apparatus that controls access to a storage medium for data, the storage medium including a storage area that includes a plurality of unit areas in at least a part of the storage area, each unit area being a respective discrete non-overlapping subdivision of said storage area and including a respective plurality of physical sectors, the control apparatus comprising:

an access-area setting unit that dynamically specifies one of the unit areas, in which logical sectors of a set of logical sectors are assigned to respective physical sectors, as an access area for data, wherein for each of said unit areas, each physical sector within the respective unit area corresponds to a respective one of said logical sectors of said set of logical sectors;

an addressing unit that updates a first address specified as a write address in a data write request with a second address that represents a physical sector, within the unit area specified as the access area by said access-area setting unit, which corresponds to a logical sector of said set of logical sectors associated with the first address; and a valid-area changing unit that, at a predetermined time, migrates whole data in a first physical sector to a second physical sector, said second physical sector being within the unit area currently specified as the access area by said access-area setting unit, said first physical sector being within one of the unit areas that was specified as the access area before the unit area currently specified as the access area had been specified as the access area by said access-area setting unit, said first and second physical sectors corresponding to the same logical sector of said set of logical sectors.

7. The control apparatus according to claim 6, wherein, after the access-area setting unit has dynamically specified one of the unit areas as the access area, when data is read from a third physical sector in one of the unit areas that was specified as the access area before the current access area has been specified, the valid-area changing unit migrates whole data, including the read data, for a fourth physical sector to the fourth physical sector, to which the same logical sector as a logical sector assigned to the third physical sector is assigned, in the unit area, which has been specified as the access area.

8. The control apparatus according to claim 6, wherein, after the access-area setting unit has dynamically specified one of the unit areas as the access area, when a request for writing first data is submitted, before the first data is written, the valid-area changing unit migrates whole data in a third physical sector to a fourth physical sector, to which the first data needs to be written, in the unit area, which has been specified as the access area, from the third physical sector, to which the same logical sector as a logical sector assigned to the fourth physical sector is assigned, in one of the unit areas that was specified as the access area before the current access area has been specified.

9. The control apparatus according to claim 6, wherein, after the access-area setting unit has dynamically specified one of the unit areas as the access area, within a predetermined period of time, the valid-area changing unit migrates whole data in third physical sectors to respective fourth physical sectors in the unit area, which has been specified as the access area, from the third physical sectors, to which the same logical sectors as logical sectors assigned to the fourth physical sectors are assigned, in one of the unit areas that was specified as the access area before the current access area has been specified.

10. The control apparatus according to claim 6, wherein, after the access-area setting unit has dynamically specified one of the unit areas as the access area, when the storage medium has not been accessed for a predetermined period of time, the valid-area changing unit migrates whole data in third physical sectors to respective fourth physical sectors in the unit area, which has been specified as the access area, from the third physical sectors, to which the same logical sectors as logical sectors assigned to the fourth physical sectors are assigned, in one of the unit areas that was specified as the access area before the current access area has been specified.

11. The control apparatus according to claim 6, wherein the valid-area changing unit generates and stores valid area information in a memory, the valid area information specifying a physical sector in which the latest data is written among physical sectors to which the same logical sector is assigned in individual unit areas that were specified as the access area before the current access area has been specified, and updates the valid area information upon migrating the latest data so that the valid area information represents a physical sector to which the latest data has been migrated.

12. The control apparatus according to claim 11, wherein, when a data read request is submitted, the addressing unit determines a physical sector in which the latest data is written with reference to the valid area information and specifies the physical sector as an access address.

13. A data storage unit comprising:
a storage medium that includes a storage area that includes a plurality of unit areas in at least a part of the storage area, each unit area being a respective discrete non-overlapping subdivision of said storage area and including a respective plurality of physical sectors; and
a control circuit that controls data read and write operation on the storage medium,
wherein the control circuit comprises:
an access-area setting unit that dynamically specifies one of the unit areas, in which logical sectors of a set of logical sectors are assigned to respective physical sectors, as an access area for data, wherein for each of said unit areas, each physical sector within the respective unit area corresponds to a respective one of said logical sectors of said set of logical sectors,;
an addressing unit that updates a first address specified as a write address in a data write request for the part of the storage area, in which the unit areas are provided, with a second address that represents a physical sector, within the unit area specified as the access area by said access-area setting unit, which corresponds to a logical sector of said set of logical sectors associated with the first address, and
a valid-area changing unit that, at predetermined time, migrates whole data in a first physical sector to a second physical sector, said second physical sector being within the unit area currently specified as the access area by said access-area setting unit, said first physical sector being within one of the unit areas that was specified as the access area before the unit area currently specified as the access area had been specified as the access area by said access-area setting unit, said first and second physical sectors corresponding to the same logical sector of said set of logical sectors.

14. The data storage unit according to claim 13, wherein, after the access-area setting unit has dynamically specified one of the unit areas as the access area, when data is read from a third physical sector in one of the unit areas that was specified as the access area before the current access area has been specified, the valid-area changing unit migrates whole data, including the read data, for a fourth physical sector to the fourth physical sector, to which the same logical sector as a logical sector assigned to the third physical sector is assigned, in the unit area, which has been specified as the access area.

15. The data storage unit according to claim 13, wherein, after the access-area setting unit has dynamically specified one of the unit areas as the access area, when a request for writing first data is submitted, before the first data is written, the valid-area changing unit migrates whole data in a third physical sector to a fourth physical sector, to which the first data needs to be written, in the unit area, which has been specified as the access area, from the third physical sector, to which the same logical sector as a logical sector assigned to the fourth physical sector is assigned, in one of the unit areas that was specified as the access area before the current access area has been specified.

16. The data storage unit according to claim 13, wherein, after the access-area setting unit has dynamically specified one of the unit areas as the access area, within a predetermined period of time, the valid-area changing unit migrates whole data in third physical sectors to respective fourth physical sectors in the unit area, which has been specified as the access area, from the third physical sectors, to which the same logical sectors as logical sectors assigned to the fourth physical sectors are assigned, in one of the unit areas that was specified as the access area before the current access area has been specified.

17. The data storage unit according to claim 13, wherein the valid-area changing unit generates and stores valid area information in a memory, the valid area information specifying a physical sector in which the latest data is written among physical sectors to which the same logical sector is assigned in individual unit areas that were specified as the access area before the current access area has been specified, and updates the valid area information upon migrating the latest data so that the valid area information represents a physical sector to which the latest data has been migrated.

18. A method for controlling a data storage unit that includes a storage area that includes a plurality of unit areas in at least a part of the storage area, each unit area being a respective discrete non-overlapping subdivision of said storage area and including a respective plurality of physical sectors, the method comprising steps of:
dynamically specifying one of the unit areas, in which logical sectors of a set of logical sectors are assigned to respective physical sectors, as an access area for data, wherein for each of said unit areas, each physical sector within the respective unit area corresponds to a respective one of said logical sectors of said set of logical sectors;
updating, in a case where a data write request for the storage area is submitted, a first address specified as a write address in the data write request with a second address that represents a physical sector within the unit area specified as the access area by said access-area setting unit, which corresponds to a logical sector of said set of logical sectors associated with the first address; and
migrating whole data, including data that is read from a third physical sector in one of the unit areas that was specified as the access area before the unit area currently specified as the access area had been specified as the access area by said dynamically specifying one of the unit areas, to a fourth physical sector, said fourth physical sector being within the unit area currently specified as the access area by said dynamically specifying one of the unit areas, said fourth physical sector corresponding to the same logical sector as the logical sector to which the third physical sector corresponds when the data is read from the third physical sector after dynamically specifying the unit area currently specified as the access area.

19. The method according to claim 18, further comprising steps of:
changing the access area at predetermined time; and
migrating whole data, including data that is read from a third physical sector in one of the unit areas that was specified as the access area before the access area has been changed, for a fourth physical sector to the fourth physical sector, to which the same logical sector as a logical sector assigned to the third physical sector is assigned, in the unit area, which has been specified as the changed access area, when the data is read from the third physical sector after the access area has been changed.

20. The method according to claim 18, further comprising a step of recognizing a physical sector in which the latest data is written by:

generating valid area information that specifies the physical sector, in which the latest data is written, among physical sectors to which the same logical sector is assigned in individual unit areas that were specified as the access area before the current access area has been specified, and updating the valid area information upon migrating the latest data so that the valid area information represents a physical sector to which the latest data has been migrated.

21. A program tangibly embodied as a plurality of machine-executable instructions recorded on a machine-readable media for controlling access by a computer to an external storage unit for data, the external storage unit including a storage area that includes a plurality of unit areas in at least a part of the storage area, each unit area being a respective discrete non-overlapping subdivision of said storage area and including a plurality of physical sectors, said program performing functions as:

an access-area setting function that dynamically specifies one of the unit areas, in which logical sectors of a set of logical sectors are assigned to respective physical sectors, as an access area for data, wherein for each of said unit areas, each physical sector within the respective unit area corresponds to a respective one of said logical sectors of said set of logical sectors;

an addressing function that, in a case where a CPU submits a data write request for the external storage unit, updates a first address specified as a write address in the data write request with a second address that represents a physical sector, within the unit area specified as the access area by said access-area setting unit, which corresponds to a logical sector of said set of logical sectors associated with the first address; and a valid-area changing function that, at predetermined time, migrates whole data in a first physical sector to a second physical sector, said second physical sector being within the unit area currently specified as the access area by said access-area setting unit, said first physical sector being within one of the unit areas that was specified as the access area before the unit area currently specified as the access area had been specified as the access area by said access-area setting unit, said first and second physical sectors corresponding to the same logical sector of said set of logical sectors.

22. The program according to claim 21, wherein, after the access-area setting means has dynamically specified one of the unit areas as the access area, when data is read from a third physical sector in one of the unit areas that was specified as the access area before the current access area has been specified, the valid-area changing means migrates whole data, including the read data, for a fourth physical sector to the fourth physical sector, to which the same logical sector as a logical sector assigned to the third physical sector is assigned, in the unit area, which has been specified as the access area.

23. The program according to claim 21, wherein, after the access-area setting means has dynamically specified one of the unit areas as the access area, when a request for writing first data is submitted, before the first data is written, the valid-area changing means migrates whole data in a third physical sector to a fourth physical sector, to which the first data needs to be written, in the unit area, which has been specified as the access area, from the third physical sector, to which the same logical sector as a logical sector assigned to the fourth physical sector is assigned, in one of the unit areas that was specified as the access area before the current access area has been specified.

24. The program according to claim 21, wherein, after the access-area setting means has dynamically specified one of the unit areas as the access area, within a predetermined period of time, the valid-area changing means migrates whole data in third physical sectors to respective fourth physical sectors in the unit area, which has been specified as the access area, from the third physical sectors, to which the same logical sectors as logical sectors assigned to the fourth physical sectors are assigned, in one of the unit areas that was specified as the access area before the current access area has been specified.

25. The program according to claim 21, wherein the valid-area changing means causes the computer to perform a step of generating and storing valid area information in a memory, the valid area information specifying a physical sector in which the latest data is written among physical sectors to which the same logical sector is assigned in individual unit areas that were specified as the access area before the current access area has been specified, and a step of updating the valid area information upon migrating the latest data so that the valid area information represents a physical sector to which the latest data has been migrated.

* * * * *